(12) United States Patent
Kurtz et al.

(10) Patent No.: US 7,714,591 B2
(45) Date of Patent: May 11, 2010

(54) APPARATUS AND METHODS FOR LINEARIZING PIEZORESISTIVE WHEATSTONE BRIDGES

(75) Inventors: Anthony D. Kurtz, Saddle River, NJ (US); Joseph R. Van DeWeert, Maywood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 274 days.

(21) Appl. No.: 11/512,598

(22) Filed: Aug. 30, 2006

(65) Prior Publication Data

US 2007/0152679 A1    Jul. 5, 2007

Related U.S. Application Data

(63) Continuation-in-part of application No. 11/311,988, filed on Dec. 20, 2005, now abandoned.

(51) Int. Cl.
*G01R 27/02* (2006.01)

(52) U.S. Cl. .............. 324/610; 324/648; 324/706; 324/725

(58) Field of Classification Search .......... 324/610, 324/706, 725, 648, 727
See application file for complete search history.

(56) References Cited

U.S. PATENT DOCUMENTS

| | | | |
|---|---|---|---|
| 4,333,349 A | 6/1982 | Mallon et al. | |
| 4,345,477 A * | 8/1982 | Johnson | 73/766 |
| 4,419,620 A | 12/1983 | Kurtz et al. | |
| 4,481,497 A * | 11/1984 | Kurtz et al. | 338/2 |
| 4,522,072 A * | 6/1985 | Sulouff et al. | 73/765 |
| 4,765,188 A * | 8/1988 | Krechmery et al. | 73/708 |
| 5,445,006 A * | 8/1995 | Allen et al. | 73/1.38 |
| 5,614,678 A | 3/1997 | Kurtz et al. | |
| 5,625,144 A * | 4/1997 | Chang | 73/146.3 |
| 5,686,826 A * | 11/1997 | Kurtz et al. | 323/365 |
| 5,714,690 A | 2/1998 | Burns et al. | |
| 6,612,179 B1 | 9/2003 | Kurtz | |
| 7,284,440 B2 * | 10/2007 | Kurtz et al. | 73/753 |
| 7,284,441 B2 * | 10/2007 | Zdeblick | 73/753 |
| 2003/0213288 A1* | 11/2003 | Mireles et al. | 73/61.43 |
| 2006/0219021 A1* | 10/2006 | Kurtz et al. | 73/736 |

* cited by examiner

*Primary Examiner*—Thomas Valone
(74) *Attorney, Agent, or Firm*—Troutman Sanders, LLP; James E. Schutz

(57) ABSTRACT

A pressure sensing apparatus including: at least one deflectable diaphragm having a center, wherein each diaphragm supports: at least one positive piezoresistive gauge and at least one negative piezoresistive gauge coupled in series across a voltage differential in a half-Wheatstone bridge configuration having an output between the positive and negative piezoresistive gauges; and, a compensating piezoresistive gauge coupled in series with the half-Wheatstone bridge configuration across the voltage differential; wherein, the compensating piezoresistive gauge is nearer the center of the diaphragm than the negative piezoresitive gauge, the negative piezoresitive gauge is nearer the center of the diaphragm than the positive piezoresitive gauge, and the compensating piezoresistive gauge linearizes the half-Wheatstone bridge output.

19 Claims, 3 Drawing Sheets

|       | Old ΔR (Ω) | New ΔR (Ω) | Relative Stress | Active Gauge (Ω) | Dead Resistance (Ω) | Non-Linearity (%FSO) |
|-------|------------|------------|-----------------|------------------|---------------------|----------------------|
| Row 1 | 74.3       | 0          | 1               | 0                | 0                   | -0.37                |
| Row 2 | 74.3       | 28.4       | 1               | 614              | 0                   | 0                    |
| Row 3 | 74.3       | 26.7       | 1.5             | 384              | 0                   | 0                    |
| Row 4 | 74.3       | 25.9       | 2               | 280              | 0                   | 0                    |
| Row 5 | 74.3       | 44.0       | 2               | 475              | 1000                | 0.1                  |

APPARATUS AND METHODS FOR LINEARIZING PIEZORESISTIVE WHEATSTONE BRIDGES

RELATED APPLICATION

This application is a continuation-in-part application of U.S. patent application Ser. No. 11/311,988, entitled Apparatus and Methods for Linearizing Piezoresistive Wheatstone Bridges, filed Dec. 20, 2005 now abandoned the entire disclosure of which is hereby incorporated by reference as if being set forth in its entirety herein.

FIELD OF THE INVENTION

This invention relates to piezoresistive bridges and more particularly to methods and apparatus for linearizing piezoresistive Wheatstone bridges.

BACKGROUND OF THE INVENTION

The prior art includes various circuits which operate to linearize the output of piezoresistive transducers. Essentially, piezoresistive devices such as transducers will exhibit a varying output voltage upon application of a varying pressure or force. In regard to transducers, in general, it is desirable that the output voltage be linearly related to the applied pressure or force and thus exhibit a straight line characteristic. In practice such devices do not exhibit a straight line characteristic but are non-linear and, for example, the output voltage for a certain range of pressures does not follow the same slope as for lower ranges of pressures. This results in a non-linear transfer characteristic of the transducer.

Techniques exist in the prior art as to how to achieve compensation of such a device. The prior art has many examples of circuits which will increase the voltage applied to the transducer as the pressure increases. In this way the non-linearity is compensated for. Non-linearities can arise for many reasons in piezo-resistive pressure sensors. These include electrical, material and mechanical non-linearities, all of which add to a sensor's overall non-linearity. Material and electrical non-linearities tend to be random and are usually not large. Mechanical non-linearities are generally small as well. However, they can become large when the diaphragm deflection is not small compared to its thickness. This occurs with low pressure transducers or when a high output is needed for other pressure ranges. In these situations the diaphragm does not deflect as much as it would under linear conditions, which therefore leads to a loss in output at greater pressures. This non-linearity is known as a negative non-linearity. The negative non-linearities are a problem for all high accuracy pressure sensors but is especially troublesome when two half bridges are used to make a differential sensor.

Reference is made to U.S. Pat. No. 6,612,179, entitled Method and Apparatus for the Determination of Absolute Pressure and Differential Pressure Therefrom, issued on Sep. 2, 2003 to A. D. Kurtz, one of the inventors herein and assigned to Kulite Semiconductor Products, Inc., the assignee herein. That patent shows a combination absolute and differential pressure sensing device, which includes a plurality of absolute pressure transducers. Each transducer includes a plurality of half-bridge piezoresistive structures and means for selectively coupling at least one of the plurality of half-bridge structures of a first absolute transducer to at least one resistor or half-bridge of another piezoresistive structure. This forms a half-active, full Wheatstone bridge circuit, which can be adapted to measure an absolute pressure. Furthermore, at least one other of the plurality of half-bridge structures is coupled to another half-bridge structure to form a full Wheatstone bridge adapted to measure differential pressure. In this particular arrangement, small changes in the output at high pressures will lead to large differences in output in differential pressure at different line pressures. Namely, the output with the main transducer at 25% and the reference at 0 will be larger than the output with the main transducer at 100% and the reference at 75%. The entire disclosure of U.S. Pat. No. 6,612,179 is hereby incorporated by reference as if being set forth in its entirety herein.

As indicated above, there exist ways to compensate for such a non linearity that use active elements, such as amplifiers and transistors. For an example of such a compensation technique, reference is made to U.S. Pat. No. 4,419,620, entitled Linearizing Circuits for a Semiconductor Pressure Transducer, issued on Dec. 6, 1983 to A. D. Kurtz et al, and assigned to the assignee herein. In that patent there is shown a circuit which linearizes the output of a differential pressure transducer. The circuit includes first and second operational amplifiers, where each amplifier is associated with threshold devices such as diodes, so that one amplifier will be active for one condition of output polarity while the other amplifier will be active for the other condition of output polarity. The conditions can be positive and negative. The output of the amplifiers are connected to a common terminal, which provides a compensating biasing voltage to the transducer. The voltage varies in a "V" shaped characteristic to enable one to achieve a linear output voltage from the transducer for both positive and negative pressure differences. The entire disclosure of U.S. Pat. No. 4,419,620 is hereby incorporated by reference as if being set forth in its entirety herein.

The approach of U.S. Pat. No. 4,419,620 requires the use of active elements such as transistors and diodes. The active elements are subjected to many other problems if they are not properly isolated. These problems are associated as well with changes in temperature and voltage changes, whereby other separate compensating techniques are required for the active devices.

It would be desirable to enable compensation and linearization of a differential sensor device, such as a device including two half-bridges, and to compensate or linearize the device using only simple passive components for high temperature or low voltage applications.

SUMMARY OF THE INVENTION

A pressure sensing apparatus including: at least one deflectable diaphragm having a center, wherein each diaphragm supports: at least one positive piezoresistive gauge and at least one negative piezoresistive gauge coupled in series across a voltage differential in a half-Wheatstone bridge configuration having an output between the positive and negative piezoresistive gauges; and, a compensating piezoresistive gauge coupled in series with the half-Wheatstone bridge configuration across the voltage differential; wherein, the compensating piezoresistive gauge is nearer the center of the diaphragm than the negative piezoresitive gauge, the negative piezoresitive gauge is nearer the center of the diaphragm than the positive piezoresitive gauge, and the compensating piezoresistive gauge linearizes the half-Wheatstone bridge output.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts and in which.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in typical transducer methods and systems. However, because such elements are well known in the art, and because they do not facilitate a better understanding of the present invention, a discussion of such elements is not provided herein.

Figure 1B:
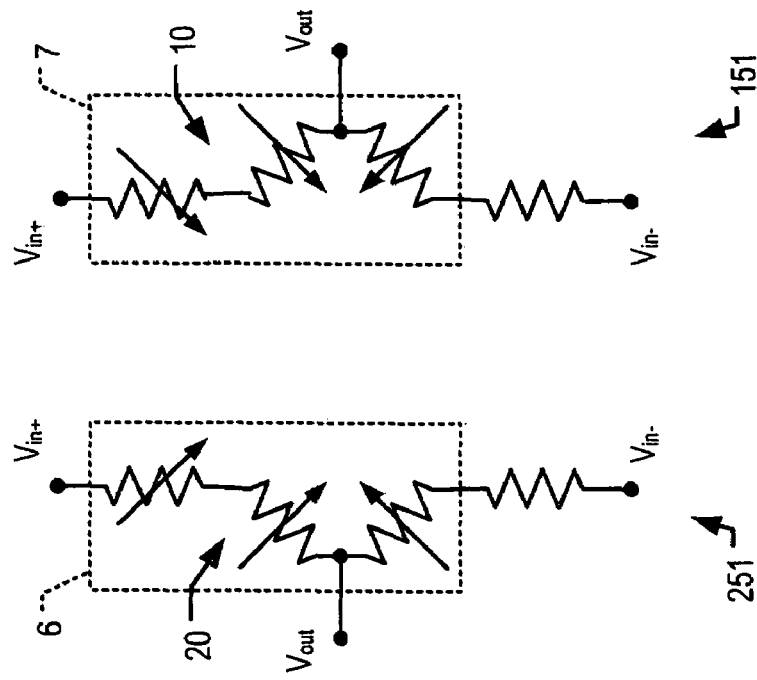
FIGS. 1A and 1B show a schematic diagrams of linearized half bridges according to embodiments of the present invention.
Figure 1A:
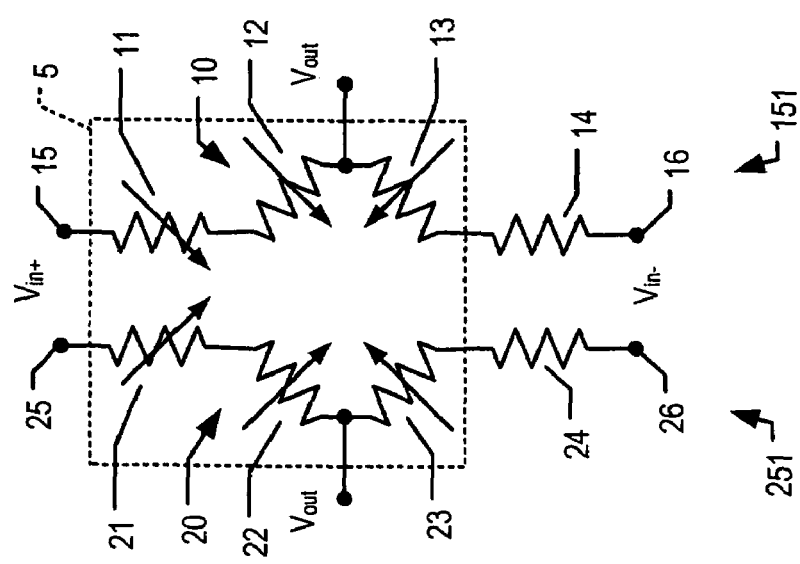

Referring to FIG. 1A there is shown two half-bridge circuits 10, 20. Half-bridge 10 is shown on the right and is designated as a reference half bridge. Half-bridge 20 is shown on the left and is designated as a main half bridge. As seen, half-bridge 10 includes resistors 12 and 13, with the terminal between them designated as $V_{out(-)}$. Resistor 12 as seen is a negative gauge while resistor 13 is a positive gauge. In the illustrated figures, a negative gauge is shown as a "down" arrow and a positive gauge is shown as an "up" arrow. In a similar manner, the main half-bridge 20 includes negative gauge 22 in series with positive gauge 23, with the terminal between the gauges designated as $V_{out(+)}$.

According to an embodiment of the present invention, each of the half-bridges 10, 20 may be formed on a common deflectable diaphragm 5 (as is shown in FIG. 1A). Referring now also to FIG. 1B, bridges 10, 20 may alternatively be formed on separate deflectable diaphragms 6, 7.

According to an embodiment of the present invention, additional active gauge resistors 11 and 21 may be added to the bridge configurations 10, 20 in order to add a non-linearity in an opposite direction from an inherent non-linearity of the bridges themselves. These two non-linearities then cancel out (that introduced each bridge 10, 20 itself offsets the non-linearity introduced by the associated gauge 11, 21), leaving a more linear composite bridge 10, 20 output over the full sensing range thereof. Such an approach is suitable for use with both full and half-Wheatstone bridge configurations.

Referring still to FIG. 1, negative going gauges 11 and 21 are placed in series to the positive sides ($V_{IN+}$) of the Wheatstone bridges 10, 20. Gauges 11 and 21 may be made out of the same material as the other gauges 11, 12, 21, 22. By adjusting the placement of the gauges 11 and 21 on the deflecting diagram, their relative change in resistance with pressure may be adjusted.

As illustrated in FIG. 1B, the two half-bridges 10, 20 can be located on two different diaphragms 6, 7. According to an embodiment of the present invention, each of the diaphragms may be incorporated into separate semiconductor chips, each of which chip, for example, can provide absolute and differential transducer configurations. The above noted U.S. Pat. No. 6,612,179 describes various bridge configurations, where a half-bridge from each sensor is interconnected to form a full Wheatstone bridge.

Referring again to FIGS. 1A and 1B, the half-bridges 10, 20 can be connected as by connecting the top terminals ($V_{IN+}$) together and connecting the bottom terminals ($V_{IN-}$) together to form a full Wheatstone bridge. Still referring to FIGS. 1A and 1B, terminal 15 may be connected to terminal 25 while terminal 26 may be connected to terminal 16. This forms a full Wheatstone bridge circuit configuration.

According to an embodiment of the present invention, fixed or dead resistors 14 and 24 may optionally be placed in series with the active resistors or gauges 11, 12, 21, 22, in order to provide further compensation.

Figure 2:
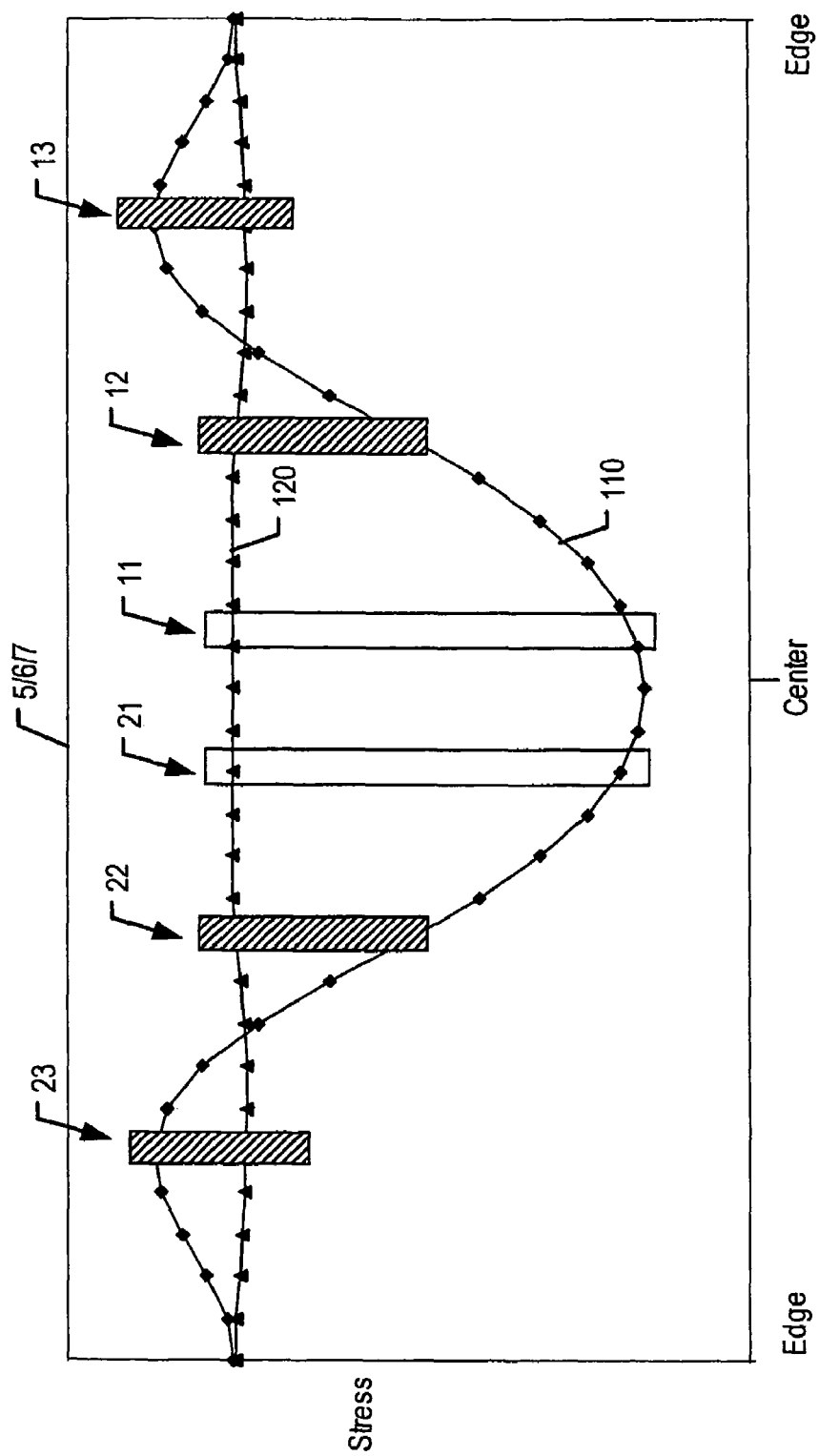
FIG. 2 shows is a diagram depicting a stress profile across a sensor diaphragm and a piezoresitive gauge positioning according to an embodiment of the present invention.

A sensor according to an embodiment of the present invention includes one or more diaphragms, each having an active area which deflects upon application of a force thereto. Referring now to FIG. 2, there is shown a diagram depicting a stress profile across such a sensor diaphragm active area and a piezoresitive gauge positioning according to an embodiment of the present invention. The illustrated diaphragm active area is suitable for use as diaphragm 5, 6 and/or 7 of FIGS. 1A and 1B. The illustrated diaphragm active area has edges and a center as shown. As the active diaphragm area deflects upon application of a force, piezoresistors positioned thereon experience longitudinal and transverse stresses. The longitudinal stress profile across the diaphragm is illustrated by curve 110. The transverse stress profile across the diaphragm is illustrated by curve 120. Reference is made to U.S. Pat. No. 5,614,678, entitled High Pressure Piezo Resistive Transducer, issued on Mar. 25, 1997 to A D Kurtz et al and assigned to the assignee herein. In that patent there are shown pressure sensors which produce outputs proportional to pressure. FIGS. 1B and 2B of the '678 patent depict graphs showing the edge to center tensile and compressive stresses exhibited on the top surface of transducer devices. In this patent there are shown pressure transducers which include piezoresistors and techniques for fabricating the same. The entire disclosure of U.S. Pat. No. 5,614,678 is hereby incorporated by reference as if being set forth in its entirety herein.

According to an embodiment of the present invention, gauges, such as 12, 13, are fabricated in (110) silicon with the underlying diaphragm made in (100) silicon. The piezoresistive effect in all silicon configurations is given by equation 1 as follows:

$$\frac{\Delta R}{R} = \sigma_x \pi_x + \sigma_y \pi_y + \sigma_z \pi_z \qquad \text{(Eq. 1)}$$

where R is the resistance of the gauge, σ is the stress in each direction, and π is the piezoresistive coefficient. By using (110) silicon it is possible to make the coefficient in the x, or longitudinal, direction equal and opposite to the coefficient in the z, or transverse, direction and also to make the coefficient in the y direction negligibly small. This yields a final equation of:

$$\frac{\Delta R}{R} = \sigma_{long}\left(\frac{\pi_{44}}{2}\right) - \sigma_{tran}\left(\frac{\pi_{44}}{2}\right). \qquad \text{(Eq. 2)}$$

For a typical pressure sensor using p-type (110) silicon $\pi_{44}$ is $2\times10^{-6}$ in²/lbs. Thus for a 10,000 psi pressure transducer with a thickness designed to produce $\sigma_{long}=50,000$ psi, equation 3 results:

$$\frac{\Delta R_{A0}}{R} = -50000\left(\frac{2\times 10^{-6}}{2}\right) - (-10000)\left(\frac{2\times 10^{-6}}{2}\right) \quad \text{(Eq. 3)}$$
$$= -.04 \text{ for Resistor } A_0.$$

For Resistor $B_{0(23)}$, equation 4 results:

$$\frac{\Delta R_{B0}(23)}{R} = 30000\left(\frac{2\times 10^{-6}}{2}\right) - 10000\left(\frac{2\times 10^{-6}}{2}\right) \quad \text{(Eq. 4)}$$
$$= .04$$

In other words, the output of an active resistor is determined by the difference in the transverse and longitudinal stress. In order to have a well balanced linear bridge output, the positive and negative going gauges are placed in regions such that they see substantially equal and opposite stresses. Such a placement of gauges 12, 13, 22 and 23 is shown by the position of the striped boxes of FIG. 2. The stress from one edge of a diaphragm to the other edge is shown in FIG. 2, with the largest negative stress near the center of the diaphragm.

Referring still to FIG. 2, the striped areas dictate where the positive and negative gauges 12, 13, 22, 23 of FIG. 1 are placed on the diaphragm according to an embodiment of the present invention. The gauges as 22 and 23 are located and positioned in the active area of the diaphragm. The center of the diaphragm as shown in FIG. 2 has a maximum negative deflection. Compensating or linearizing negative gauge resistors 11 21 may be placed near the center of the diaphragm, also at substantially identical distances from the center. Gauges 11, 21 are placed in an area of much higher differential stress leading to much larger percentage change in resistance. By moving the new resistors nearer or further from the diaphragm center, the amount of longitudinal stress they sense relative to the other resistors may be controlled, thus controlling more precisely their relative change in resistance.

The gauge placements shown in FIG. 2 are suitable for use with a single diaphragm (as is shown in FIG. 1A) or for separate diaphragms which include separate half-bridge configurations (as is shown in FIG. 1B).

Thus, for example, two different wafers with half-bridge 10 located on one wafer and half-bridge 20 located on the other wafer may be used. The half-bridges or wafers may be fabricated by the same techniques using the same masks and therefore the resistors can be located accordingly as depicted in FIG. 2.

For separate diaphragms (see, e.g., FIG. 1B), the gauges are positioned as shown. For example, gauges 21, 22 and 23 may be formed on one associated diaphragm (e.g., diaphragm 6), while gauges 11, 12 and 13 are formed on another diaphragm (e.g., diaphragm 7). Using this technique it is possible to make a much smaller value of resistance have the same change in resistance as a much larger gauge, so that a smaller resistance value is needed for the linearization.

For a compensating resistor 21, the following equation results:

$$\frac{\Delta R_{A1}}{R} = -90000\left(\frac{2\times 10^{-6}}{2}\right) - (-10000)\left(\frac{2\times 10^{-6}}{2}\right) \quad \text{(Eq. 5)}$$
$$= -.08.$$

This leads to an equation for the total change in resistance of each half of the bridge of:

$$\Delta R_{negative} = -0.04 \times R_{old} - 0.08 \times R_{new} = -\Delta - \Delta_{new} \text{ and}$$
$$\Delta R_{positive} = 0.04 \times R_{old} = +\Delta \quad \text{(Eq. 6)}$$

This unbalanced bridge allows one to correct for geometric non-linearities. Because the main geometric non-linearities in these situations are caused by mechanical deformation of the diaphragm, the same non-linearities will be seen by all the gauges regardless of stress levels. The normal equation for output from a half bridge at full scale is:

$$\frac{V_{FS}}{V_{in}} = \frac{R + \Delta_{B0}}{R + \Delta_{B0} + R - \Delta_{A0}} = \frac{R+\Delta}{2R}, \quad \text{(Eq. 7)}$$

at half scale this equation becomes:

$$\frac{V_{HS}}{V_{in}} = \frac{R + \frac{1}{2}\Delta}{2R}, \quad \text{(Eq. 8)}$$

while the zero output is:

$$\frac{V_0}{V_{in}} = \frac{R}{2R} = \frac{1}{2}. \quad \text{(Eq. 9)}$$

where R is the resistance of either leg of the bridge and $\Delta$ is the change in resistance with pressure, which is equal for both gauges in a normal unit. For a non-linear bridge one can model the non-linearity at full scale as:

$$\frac{V_{FS}}{V_{in}} = \frac{R + \Delta - \varepsilon}{2R} \quad \text{(Eq. 10)}$$

where $\varepsilon$ represents the reduction in output due to non-linear effects. Otherwise, the full scale minus the zero would be exactly twice the half scale.

For a bridge with an extra active gauge on the negative side one obtains:

$$\frac{V_0}{V_{in}} = \frac{R}{2R + R_{new}} \quad \text{(8)}$$

$$\frac{V_{HS}}{V_{in}} = \frac{R + \frac{1}{2}\Delta}{2R + R_{new} - \frac{1}{2}\Delta_{new}} \quad \text{(9)}$$

$$\frac{V_{FS}}{V_{in}} = \frac{R + \Delta - \varepsilon}{2R + R_{new} - \Delta_{new} - \varepsilon_{new}} \quad \text{(Eq. 11)}$$

where $\Delta_{new}$ and $\epsilon_{new}$ are related to the gauges 12, 13, 22, 23 by the ratio of the gauges 11, 21 to the gauges 12, 13, 22, 23.

From these formulae it can be seen that as the original $\epsilon$ starts to bring down the output the $\epsilon$ brings it up by lowering the denominator. By choosing the ratio of the resistances along with the relative stress levels, the ratio of the half-scale to the full-scale can be corrected. Because there are two independent variables there are many possible corrections that can be used that will affect the overall sensor output as well as the common mode voltage. One can therefore select the correct resistance value and stress levels for a given application. Compensation gauges 11, 21 may not linearize the entire pressure range perfectly, but can be used to greatly reduce the errors involved.

Figures 3, 4:
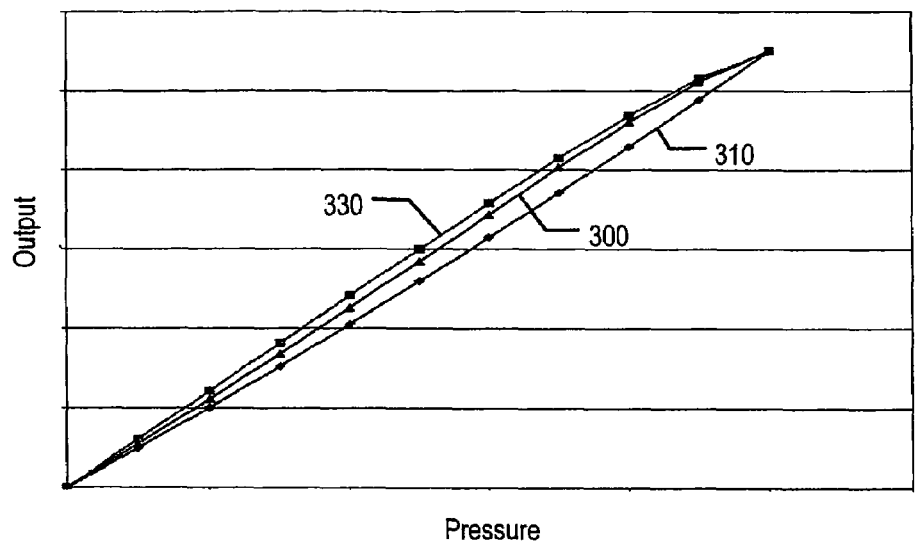
FIG. 3 is a graph showing sensor outputs with and without linearization.
FIG. 4 is a table showing resistor values suitable for compensating a 1600 ohm transducer according to an embodiment of the present invention.

By way of further non-limiting example, FIG. 3 illustrates a graph showing sensor outputs with and without linearization. As illustrated in FIG. 3, the linearized curve 300 is designated by the darkened triangle and shows the final result as compared to curve 310, which illustrates the linearizing component, as shown by the diamond, and as compared to the non-linearized transducer output curve 330, which is shown by the squares.

In order to properly use this scheme it may prove necessary to choose a different resistance value and stress levels for each compensating gauge 11, 21 for each individual sensor depending on the resistance and degree of non-linearity. By adding a fixed or a "dead" resistor 14 and 24 in series at the negative side of each half-bridge 10, 20 one can add more negative non-linearity to the system. The output for such a system is given by:

$$\frac{V_0}{V_{in}} = \frac{R + R_{dead}}{2R + R_{new} + R_{dead}} \quad \text{(Eq. 12)}$$

$$\frac{V_{HS}}{V_{in}} = \frac{R + \Delta + R_{dead}}{2R + R_{new} - \Delta_{new} + R_{dead}}$$

$$\frac{V_{FS}}{V_{in}} = \frac{R + 2\Delta - \varepsilon + R_{dead}}{2R + R_{new} - 2\Delta_{new} - \varepsilon_{new} + R_{dead}}$$

The fixed or dead resistance acts to reduce the effect of the new $\epsilon$ by lessening the percentage of the total denominator that $\epsilon$ represents. One can therefore choose a resistance and relative stress levels for the new gauge that is capable of over compensating many, such as likely, non-linearities. By adding an individually selected extra resistance the overall unit can be better linearized. This extra dead resistance can be in the form of a separate resistor that can easily be added to the circuit after pressure testing has been performed to determine the non-linearity of the system. FIG. 4 shows values of extra active resistors and dead resistances suitable for linearizing typical high pressure half-bridges with active resistors of 1600 ohms.

Either by using extra long negative going gauge resistors or using an extra negative going gauge resistor in series with the existing ones, a positive non-linearity may be induced in a piezoresistive pressure sensor. This positive non-linearity is used to counteract a negative one due to geometric effects at large diaphragm deflections. This allows for a more linear absolute sensor and better matching of differential half-bridges. The dead resistors as shown in FIG. 4 basically are represented as resistors 24 and 14 shown in FIG. 1. The first row (row 1) in the illustrative chart in FIG. 4 shows the original transducer (e.g., a Wheatstone bridge including gauges 12, 13, 22, 23) with nothing added, where the hon-linearity is −0.37%. As one can see the dead resistance basically is zero, while the new active gauges are shown in ohms, as for example, in the second row, 614, third row 384, and so on. The $\Delta$Rs would be about 28.4$\Omega$ for the second row and 26.7$\Omega$ for the third row. In the very last row (row 5), a dead resistance of 1000$\Omega$ is added, and the linearity becomes 0.1% (which is a positive non-linearity as compared to the −0.37 which is negative). Thus, it is seen from FIG. 4 that one can go from a negative non-linearity to a positive non-linearity and have a zero non linearity in between.

The values given in FIG. 4 are for a bridge with active resistance of 1600$\Omega$. Again, it is understood that the two half-bridges as depicted in FIGS. 1A and 1B can be fabricated on different wafers (as shown in FIG. 1B) as long as resistors 12, 13, 22 and 23 are of the same values and made by the same techniques.

It is also understood that there are many modifications that can be made utilizing the above noted compensating technique and apparatus and all such modifications are deemed to be within the spirit and scope of the claims appended hereto.

What is claimed is:

1. A pressure sensing apparatus comprising:
at least one deflectable diaphragm having a center, wherein each diaphragm supports:
at least one positive piezoresistive gauge and at least one negative piezoresistive gauge coupled in series across a voltage differential in a half-Wheatstone bridge configuration having an output between said positive and negative piezoresistive gauges; and,
a compensating negative piezoresistive gauge coupled in series with the half-Wheatstone bridge configuration across the voltage differential, wherein, the compensating negative piezoresistive gauge is positioned nearer the center of the diaphragm, an area of substantially higher differential stress, than the negative piezoresistive gauge, and the negative piezoresistive gauge is positioned nearer the center of the diaphragm than the positive piezoresistive gauge, wherein said negative piezoresistive gauge and said positive piezoresistive gauge are positioned in regions that experience substantially equal and opposite stresses, and said position of said compensating negative piezoresistive gauge is determined to linearize an output of the half-Wheatstone bridge, wherein a value of said compensating negative piezoresistive gauge is based on a ratio of values of said negative piezoresistive gauge and said positive piezoresistive gauge.

2. The apparatus of claim 1, wherein said at least one diaphragm comprises two diaphragms, and each of the compensating piezoresistive gauges being electrically coupled together to a corresponding negative piezoresistive gauge wherein said positive piezoresistive gauges are electrically coupled to form a Wheatstone bridge.

3. The apparatus of claim 1, wherein the at least one deflectable diaphragm further comprises:
at least a second positive piezoresistive gauge and at least a second negative piezoresistive gauge coupled in series across the voltage differential in a second half-Wheatstone bridge configuration having a second output between said second positive and second negative piezoresistive gauges; and,
a second compensating negative piezoresistive gauge coupled in series with the second half-Wheatstone bridge configuration across the voltage differential, wherein, the second compensating negative piezoresistive gauge is positioned nearer the center of the diaphragm than the second negative piezoresistive gauge, and the second negative piezoresistive gauge is positioned nearer the center of the diaphragm than the second positive piezoresistive gauge, and wherein the second compensating piezoresistive gauge linearizes the half-Wheatstone bridge output, and an output of a full Wheatstone bridge is taken between the outputs of the half- and second half-Wheatstone bridges.

4. The apparatus according to claim 1, wherein each diaphragm is fabricated from (100) silicon.

5. The apparatus according to claim 4, wherein each gauge is fabricated from (110) silicon.

6. The apparatus according to claim 1, further comprising a fixed resistance having one terminal connected to said positive piezoresistive gauge.

7. The apparatus according to claim 2, wherein each of said half-bridges are connected to provide a differential output.

8. The apparatus according to claim 1, wherein said compensating gauge is of a lower value than said active gauges.

9. The apparatus according to claim 2, wherein a first one of said half-bridges is a main bridge and a second one of said half-bridges is a reference bridge.

10. A method for linearizing a half-bridge piezoresistive transducer having active resistors in said half bridge located on an active region of a diaphragm comprising:
placing a first positive resistive gauge of said active resistors in series with a first negative resistive gauge of said active resistors in regions of said diaphragm having substantially similar and opposite stresses;
adding an active negative linearizing resistor in a higher stress region of said diaphragm than where the transducer active resistors are, and connecting said active negative linearizing resistor in series with the transducer active resistors, wherein a value of said active negative resistor is based on a ratio of values of said negative resistor and said positive resistor and a position of said negative linearizing resistor is determined within said higher stress region to linearize an output of said half-bridge.

11. The method according to claim 10, wherein said active linearizing resistor is of a lower value than said active resistors in said half-bridge.

12. The method according to claim 10 further comprising: connecting a first linearized half bridge to a second linearized half bridge to form a full linearized Wheatstone bridge.

13. The method according to claim 12 wherein said first and second half bridges are formed on first and second diaphragms.

14. The method according to claim 12 wherein said connected half bridges form a full bridge differential sensor.

15. The method according to claim 10 including the step of; fabricating all of said resistors from (110) silicon.

16. The method according to claim 15 including the step of: fabricating said diaphragm from (100) silicon.

17. The method according to claim 13 wherein the step of adding an active linearizing resistor includes placing said active linearizing resistor near the center of said diaphragm.

18. The method according to claim 17 wherein said active resistors of said half-bridges are positioned further from the center of said diaphragm than said active linearizing resistors.

19. The method according to claim 12 wherein said first and second bridges are formed on the same diaphragm.

* * * * *